May 8, 1934.　　　　A. J. MEYER　　　　1,957,503
POWER TRANSMITTING DEVICE
Filed Nov. 24, 1930　　　2 Sheets-Sheet 1
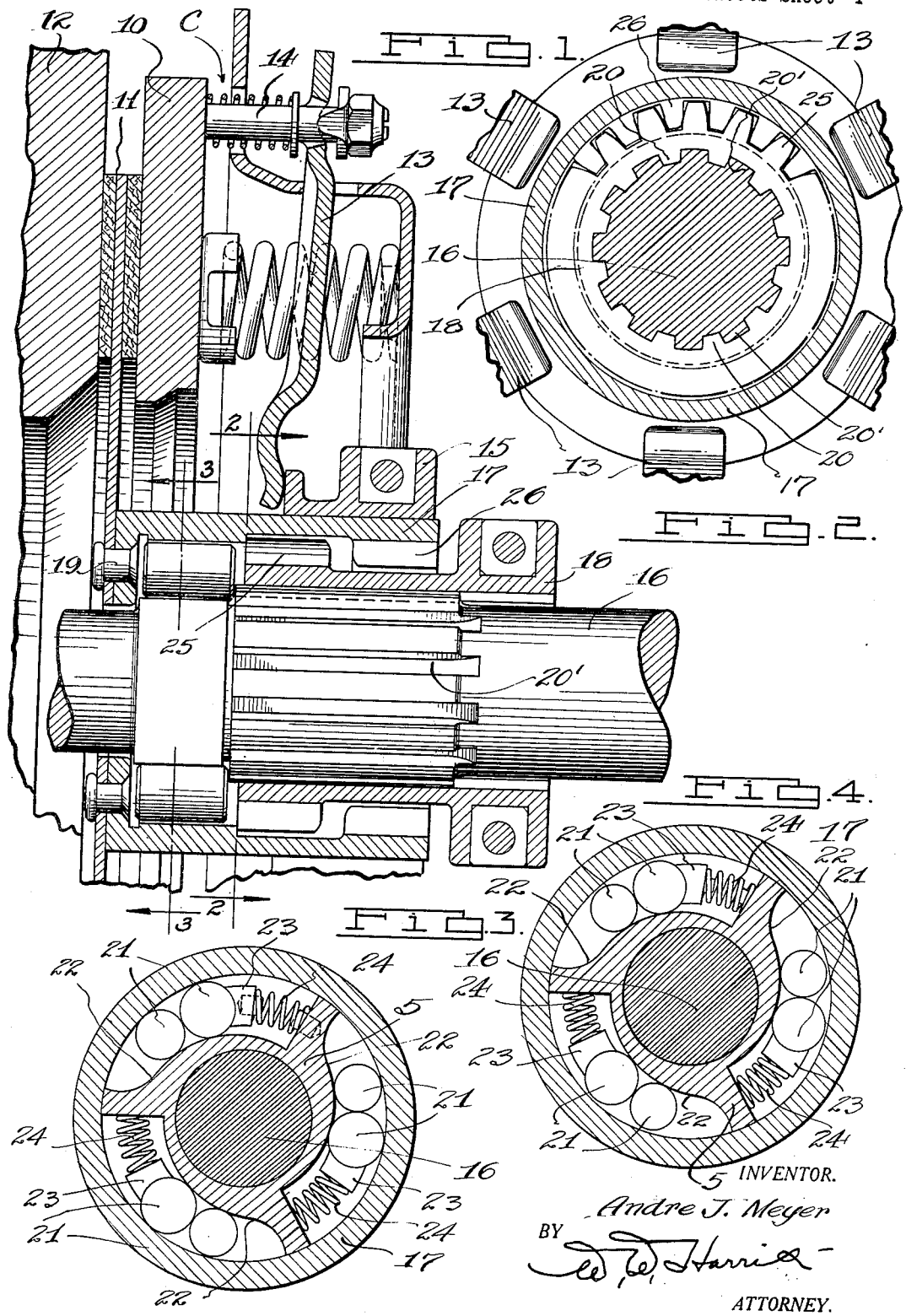
INVENTOR.
Andre J. Meyer
BY
ATTORNEY.

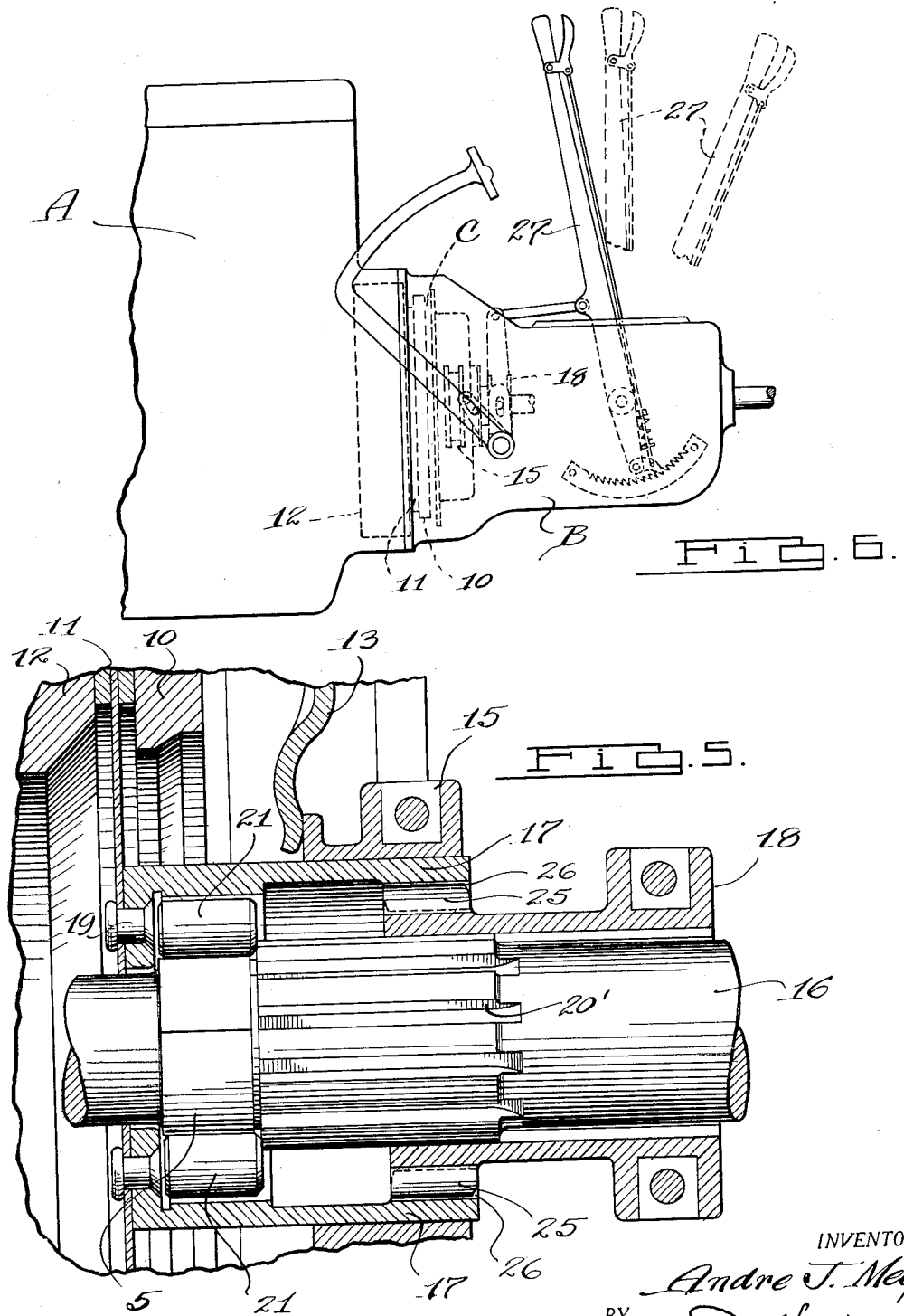

Patented May 8, 1934

1,957,503

UNITED STATES PATENT OFFICE 1,957,503

POWER TRANSMITTING DEVICE

Andre J. Meyer, Detroit, Mich., assignor to Continental Motors Corporation, Detroit, Mich., a corporation of Virginia Application November 24, 1930, Serial No. 497,685

4 Claims. (Cl. 192—48)

My invention relates to engines and more particularly to a power transmitting apparatus or device adapted for assembly with a power means or engine associated with an automobile or other vehicle of a like character.

This invention has particular reference to a free wheeling device which permits the vehicle to coast when the wheels tend to override the engine. The advantages of free wheeling devices in vehicles of this character are apparent, and the resulting economy in fuel consumption and the decreased maintenance costs have made free wheeling devices desirable features of automobile manufacture.

It is an object of my invention to facilitate the manufacture of an automobile or other vehicle equipped with a free wheeling device by providing a power transmitting means in which a free wheeling device is incorporated and which may be economically constructed and readily assembled in a vehicle of the character above described without the necessity of revamping or reconstructing the vehicle.

Another object of my invention is to construct a simple free wheeling device for an automobile or the like by providing a device which may be readily incorporated with the clutch assembly of a power transmitting means adapted for association with the vehicle.

A still further object of my invention is to provide an improved free wheeling device adapted for assembly with a clutch assembly of a power transmitting means associated with the power plant of a vehicle of the character as described above by providing a connecting means between one of the operating parts of the clutch and the driven element operatively connected to the vehicle wheel, which is adapted to be readily released when the vehicle wheels tend to override the engine, but which can be selectively actuated to positively connect the driven element with the engine, or power plant.

For a more detailed understanding of my invention, reference may be had to the accompanying drawings which illustrate one form which my invention may assume, and in which:

Figure 1 is a fragmentary longitudinal sectional view through a power transmitting device incorporating my improved free wheeling device, Figure 2 is a transverse sectional view taken on the line 2—2 of Figure 1, Figure 3 is a transverse sectional view taken on the line 3—3 of Figure 1, and showing the free wheeling device adapted for operatively connecting the driven member of the clutch with the driven element to which the vehicle wheels are operatively connected, Figure 4 is a view similar to Figure 3 but showing the free wheeling device positioned in such a way as to permit the driven element to rotate freely relative to the driving element and associated parts, Figure 5 is a longitudinal fragmentary sectional view showing the inoperative position of the free wheeling device wherein the two members of the said free wheeling device are operatively connected together to effect a direct driving relation between the driving and driven elements, and Figure 6 is a side elevational view of a portion of an engine equipped with my device.

As illustrated in the drawings I have provided an engine block A to which may be secured a housing B for housing the power transmitting mechanism. Said power transmitting mechanism includes a clutch assembly C which comprises in general a pressure plate or clutch driving member 10 which yieldingly clamps the driven disc or clutch driven member 11 between the pressure plate and flywheel 12, thereby effecting a direct driving relation between the flywheel and clutch disc 11. Suitable mechanism for actuating or moving the pressure plate is provided and consists of a lever 13 adapted for engagement with a pin 14 carried by the pressure plate and actuated by means of a clutch collar 15, whereby movement of the clutch collar actuates the clutch mechanism to pack the driven disc or release the same from engagement with the flywheel of the engine. The construction of the lever and the intermediate elements or parts between the lever and pressure plate are preferably constructed substantially similar to the standard clutch and a detailed description of the same is unnecessary for an understanding of my invention.

The flywheel or driving element 12 is adapted for operative connection through a free wheeling device with the driven element or shaft 16 which is operatively connected by any suitable means with the vehicle wheels (not shown). This free wheel device preferably consists of driving and driven means 17 and 5 respectively, sleeve 17 being adapted for attachment with the clutch disc or driven member of the clutch assembly and sleeve 5 keyed or otherwise secured with the driven element or shaft 16. In the illustrated embodiment of my invention I have provided another driven means which consists preferably of a driven sleeve 18, the sleeve 17 being attached to the pressure disc 11 by means of rivets, bolts or other suitable fastening devices designated in Figure 1 at 19 and adapted to be positively connected with sleeve 18 in a manner hereinafter described. The sleeve 18 which is slidable longitudinally of the driven element or shaft 16, is preferably provided with the internal splines 20 adapted for engagement with the external splines 20' carried by the driven shaft. The driving sleeve 17 is adapted for connection directly with the driven shaft 16 by means of a clutch device which consists preferably of one or more rollers 21 which are supported in the annularly tapered recesses 22 carried by the sleeve or member 5 which is keyed or otherwise secured to the driven shaft. Preferably the rollers 21 are backed up by a block 23 and light spring 24 which tends to yieldingly apply a force to the rollers tending to force the same into the narrow part of the recess and to wedge the rollers between the sleeves 17 and 5. It will be noted by observing Figures 3 and 4 that the rollers 21 will be substantially wedged between the driving means and the sleeve 5 carried by the driven shaft when the rollers are forced as far as they will go into the narrow part of the recess 22.

When the vehicle wheels tend to override the engine or power plant, the shaft 16 is driven at a greater relative speed than the driving sleeve 17 which is attached to the clutch disc. Thus as the driven shaft overrides the engine the rollers 21 are forced into the large end of the recess 22 against the pressure of the spring 24, thereby disconnecting the sleeve 17 from the sleeve 5 carried by said driven shaft.

In order to positively lock the free wheel driving connections between the clutch assembly and the driven element the driven means or sleeve 18, which is preferably arranged to slide longitudinally on the shaft, is brought into operation, this sleeve 18 carrying the external clutch teeth 25 which are adapted for engagement with the internal clutch teeth 26 carried by the driving means 17. These driving and driven means or sleeves 17 and 18 are telescopically arranged together, the inner sleeve 18 slidable within the outer sleeve 17, said inner sleeve being adapted to be moved by means of a clutch collar which is preferably operatively connected with the emergency brake lever 27 or other means preferably operable independently of the usual clutch actuating means including the clutch collar 15 and other mechanism as described above.

It will thus be noted that I have provided a very simple free wheeling device, which can be readily and quickly manufactured at a minimum cost, and it may be noted that the arrangement of the parts is such that the free wheeling device is readily incorporated within a clutch structure or assembly of substantially standard design and selectively operated independently of the clutch actuating means.

I have provided a free wheeling structure adapted for incorporation with an engine which contains a minimum number of parts, thereby facilitating the manufacture of the engine and decreasing the chances of breakage or excessive wear, since a device which is in general composed of a fewer number of parts is less liable to breakage and wear than a device containing a multiplicity of parts.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a power transmitting means adapted for association with a vehicle of the class described, driving and driven elements, a clutch assembly including driving and driven members and a free wheeling device intermediate said driven clutch member and said driven element and including driving and driven means respectively connected with the driven clutch member and driven element, clutch devices connecting said means but releasable when the driven element tends to override the driving element, a clutch actuating device one of said means having an extension providing a bearing for movably supporting said clutch actuating device, and means for interlocking said driving means and driven element in direct positive driving relation to render said free wheeling device inoperative.

2. In a power transmitting means adapted for association with a vehicle of the class described, driving and driven elements, a clutch assembly including driving and driven members and a free wheeling device intermediate said driven clutch member and said driven element and including driving and driven means respectively connected with the driven clutch member and driven element, clutch devices connecting said means but releasable when the driven element tends to override the driving element, a clutch actuating device, one of said means having an extension providing a bearing for movably supporting said clutch actuating device, and means spaced axially of said driven element from said free wheeling device and movably supported internally of said extension for connecting said driving means and driven element in direct driving relation to render said free wheeling device inoperative.

3. In a power transmitting means adapted for association with a vehicle of the class described, driving and driven elements, a clutch assembly including driving and driven members and a free wheeling device intermediate said driven clutch member and said driven element and including driving and driven means respectively connected with the driven clutch member and driven element, clutch devices connecting said means but releasable when the driven element tends to override the driving element, a clutch actuating device, one of said means having an extension providing a bearing for movably supporting said clutch actuating device, said extension having internal clutch teeth, and means supported internally of said extension and having external clutch teeth adapted to be selectively engaged with said internal clutch teeth for connecting said driving means and driven element in direct driving relation to render said free wheeling device inoperative.

4. In a power transmitting means adapted for association with a vehicle of the class described, driving and driven elements, a clutch assembly including driving and driven members and a free wheeling device intermediate said driven clutch member and said driven element and including driving and driven means respectively connected with the driven clutch member and driven element, clutch devices connecting said means but releasable when the driven element tends to override the driving element, a clutch actuating device, one of said means having an extension providing a bearing for movably supporting said clutch actuating device, said extension having internal clutch teeth, and means slidably supported by said driven element internally of said extension and movable axially thereof, said means having external teeth adapted to be selectively engaged with said internal clutch teeth for connecting said driving means and driven element in direct driving relation to render said free wheeling device inoperative.

ANDRE J. MEYER.